Jan. 5, 1960 R. R. LENT 2,920,299
STRAIN GAGE LOAD CELL
Filed Jan. 30, 1959 2 Sheets-Sheet 1

INVENTOR.
ROBERT R. LENT
BY *Philip Subrow*
*Max Gerdin*
ATTORNEYS

Jan. 5, 1960  R. R. LENT  2,920,299
STRAIN GAGE LOAD CELL
Filed Jan. 30, 1959  2 Sheets-Sheet 2

INVENTOR.
ROBERT R. LENT
BY
ATTORNEYS

United States Patent Office

2,920,299
Patented Jan. 5, 1960

2,920,299

STRAIN GAGE LOAD CELL

Robert R. Lent, Pacific Palisades, Calif., assignor to Statham Instruments, Inc., Los Angeles, Calif., a corporation of California Application January 30, 1959, Serial No. 790,208

10 Claims. (Cl. 338—4)

This invention relates to a transducer capable of measuring force such as pressure or acceleration, or displacement, and is particularly concerned with a novel multi-range transducer.

A requirement for multi-range pressure transducers and/or load cells has existed for some time. One of the problems that confront the instrumentation engineer in measuring pressure or load is the existence of high overload conditions. It is desirable in many instances (1) to be able to measure accurately the normal pressure or load involved, (2) to protect the instrument from damage as a result of overload, and (3) to measure accurately the extent of the overload.

With prior art transducers it is not practically feasible to accomplish all of these measurements, and it is usually necessary to compromise in favor of one or the other. If the most important measurement is the normal pressure, then the instrument must be protected from the overload condition by mechanically and/or electrically setting the stops on the transducer so that it will not see an overload condition. By so doing, this precludes measuring the extent of the overload involved, thus denying the opportunity to analyze the cause of the overload. If it is desirable to measure the extent of overload, then it is necessary to go to a higher range instrument with the resultant loss in sensitivity in measurements in the lower range.

There are two basic types of strain gage load cells and pressure transducers which use a load column principle. One is the bonded gage and the other the unbonded gage. On the bonded gage transducer the strain wire is bonded to the load column and the resulting strain ratio is 1 to 1. It is the nature of this design that the mechanical and electrical overload protection is nominal. For example, in the case of certain commercially available forms of bonded gage load cells, the overload protection is 120% of rated load, which provides a maximum overload protection of 20%.

Unbonded strain gages are generally composed essentially of a strain sensitive wire connected to two supports which are subject to separation under an applied force. When subjected to tension or compression, the wire changes in dimensions, and therefore changes in resistance. Means are provided for measuring the resulting change in resistance which is then translatable into a measurement of the applied force. Such gages have found a wide application in industry.

In view of the fact that the unbonded gage is not an integral part of a load column it is possible to introduce strain amplification on a ratio, for example, of 5 to 1 or 3 to 1, or whatever ratio may be desirable. Therefore, overload protection on an unbonded strain gage pressure transducer or load cell using a load column can be extended to say 300% to 400%. This 300% to 400% is available without the necessity of mechanical or electrical stops.

In U.S. application Serial No. 762,486, filed September 22, 1958, of Mario Di Giovanni, there is disclosed an unbonded strain wire transducer comprising a strain column and an armature preferably in the form of an elongated cylinder connected to the strain column at spaced points axially of the column. The armature between said points is spaced radially of said column, and has a plurality of arcuate slots about its periphery intermediate said spaced points of connection, the center line of said slots being in a plane or planes substantially normal to the axis of the strain column or armature. The slots are preferably symmetrically positioned about the periphery of the armature. Spaced wire connections or pins are mounted on the armature on opposite sides of said slots, there being preferably a plurality, e.g., two, sets of spaced pins in diametrically opposed positions on said armature. Strain wires are looped in tension between the spaced pins of each of said sets of pins.

Preferably two sets of aligned peripheral slots are employed, said sets of slots being positioned so that the center lines of each set of slots are in parallel planes and perpendicular to the armature axis, and being spaced a short distance from each other axially of the armature. Said sets of slots are staggered so that a metal portion of the armature between the aligned slots of one set of slots is positioned opposite a slot of the other aligned set of slots. The strain wires are preferably stretched in tension on pins positioned across a slot of one set of slots and on an adjacent metal portion between the aligned slots of the adjacent set of slots. In accordance with this construction one pin adjacent the slot is movable with the end portion of the armature on which it is mounted with respect to the other pin positioned on the metal portion of the armature between the slots of the adjacent set of slots.

A force summing means or force collector, for example in the form of a diaphragm and an associated piston, are connected to an end of the strain column. When a force or pressure is applied to the force collector and transmitted to the strain column, the latter is compressed or elongated, producing a corresponding displacement of the armature and the strain wires carried by the pins on the armature. In a preferred embodiment, the strain column is compressed on the application of such force. The result is a change in strain of the strain wires, producing an output from a bridge circuit in which the strain wires are connected, proportional to the force or the displacement of the strain column.

The advantages of this form of transducer are set forth in the above application.

It is an object of the present invention to provide an unbonded strain wire transducer which is sensitive to a wide range of pressure, force or displacement.

Another object is the provision of an instrument of the foregoing character embodying overload protection for the strain wires.

A particular object is the modification of the transducer design of the aforementioned Di Giovanni application into a multi-range transducer.

Other objects and advantages will be apparent hereinafter.

The above and other objects are accomplished to provide a multi-range transducer according to the invention, by incorporating in an unbonded strain wire transducer, e.g., of the type described in the above identified application, a plurality of strain gage sensing units having variable gage lengths. According to one embodiment, two or more individual unbonded strain gage sensing units are mounted on a load or strain column of a transducer comprising same, such as that of the above Di Giovanni application. Thus, for example, one sensing unit can be of a gage length which will measure 0 to 5000 p.s.i., the other sensing unit having a different gage length designed to measure 0 to 15,000 p.s.i. The sensing units of different gage length can be mounted, for example, across the slotted portion of the armature of the instrument of the above Di Giovanni application. These sensing units operate independently of each other. In this manner an instrument can be provided that can dynamically measure any force accurately within the range of 0 to 5,000 p.s.i., and in the event of overload, it will accurately measure an overload condition between 5,000 and 15,000 p.s.i. without sacrifice of sensitivity or detrimental effect on the smaller range unit.

The invention will be readily understood by references to the following description of a preferred embodiment, taken in connection with the accompanying drawings wherein.

Figure 1:
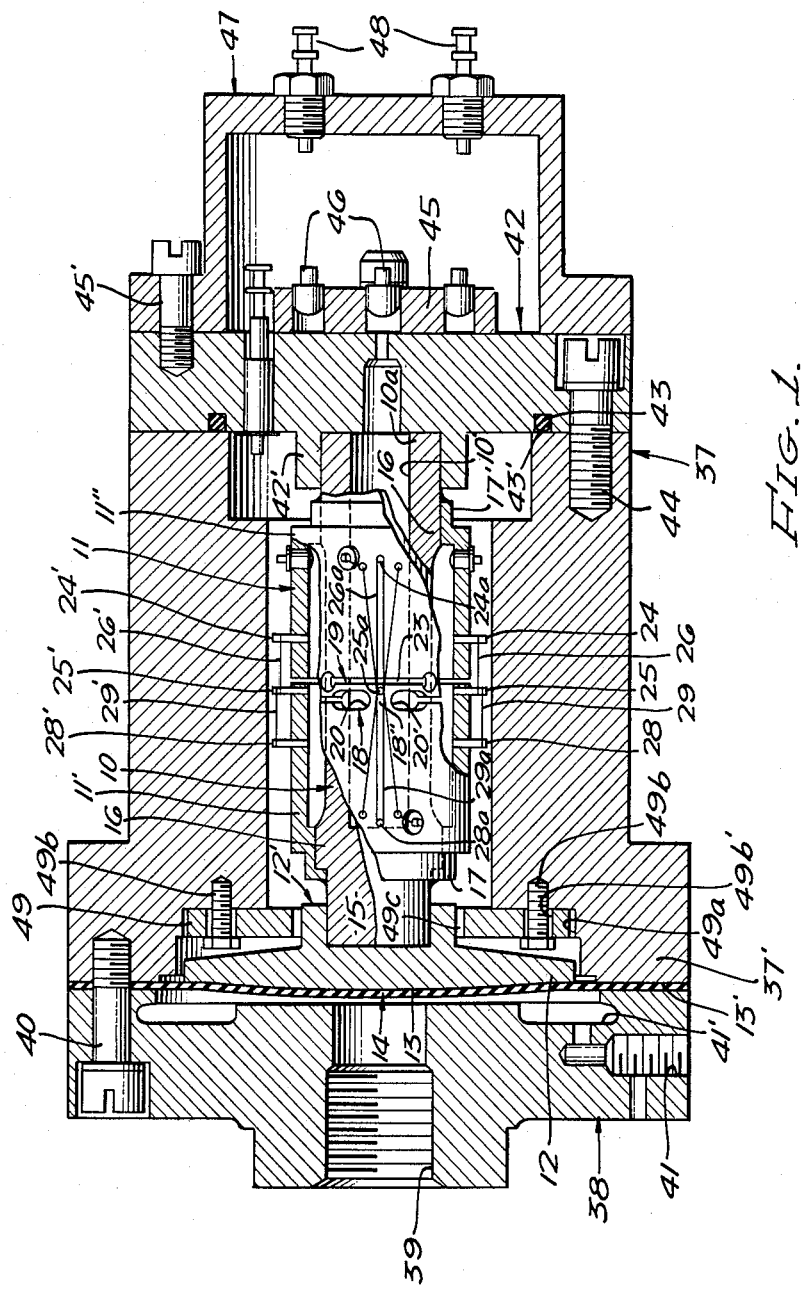
Fig. 1 is a longitudinal sectional view of a preferred embodiment of the invention.

Referring to the drawings, the instrument is composed of a strain column 10 which is of elongated cylindrical shape and which is hollow along its major portion, as indicated at 10'. About the strain column is positioned a cylindrical armature 10 which is mounted on the strain column at the ends of the armature. On one end of the strain column is positioned an integral block portion 15 on which is mounted a piston 12, the piston having a flange 12' which is fastened, for example, by force fitting or by brazing, about the end block 15 of the strain column. Connected to the outer face of the piston 12 by suitable means such as brazing is a diaphragm 13, the outer periphery 13' of the diaphragm being clamped between the case 37 and pressure head 38. The piston 12 and diaphragm 13 together constitute a force collector or force summing means which transmits an applied force to the strain column.

Figures 2, 3:
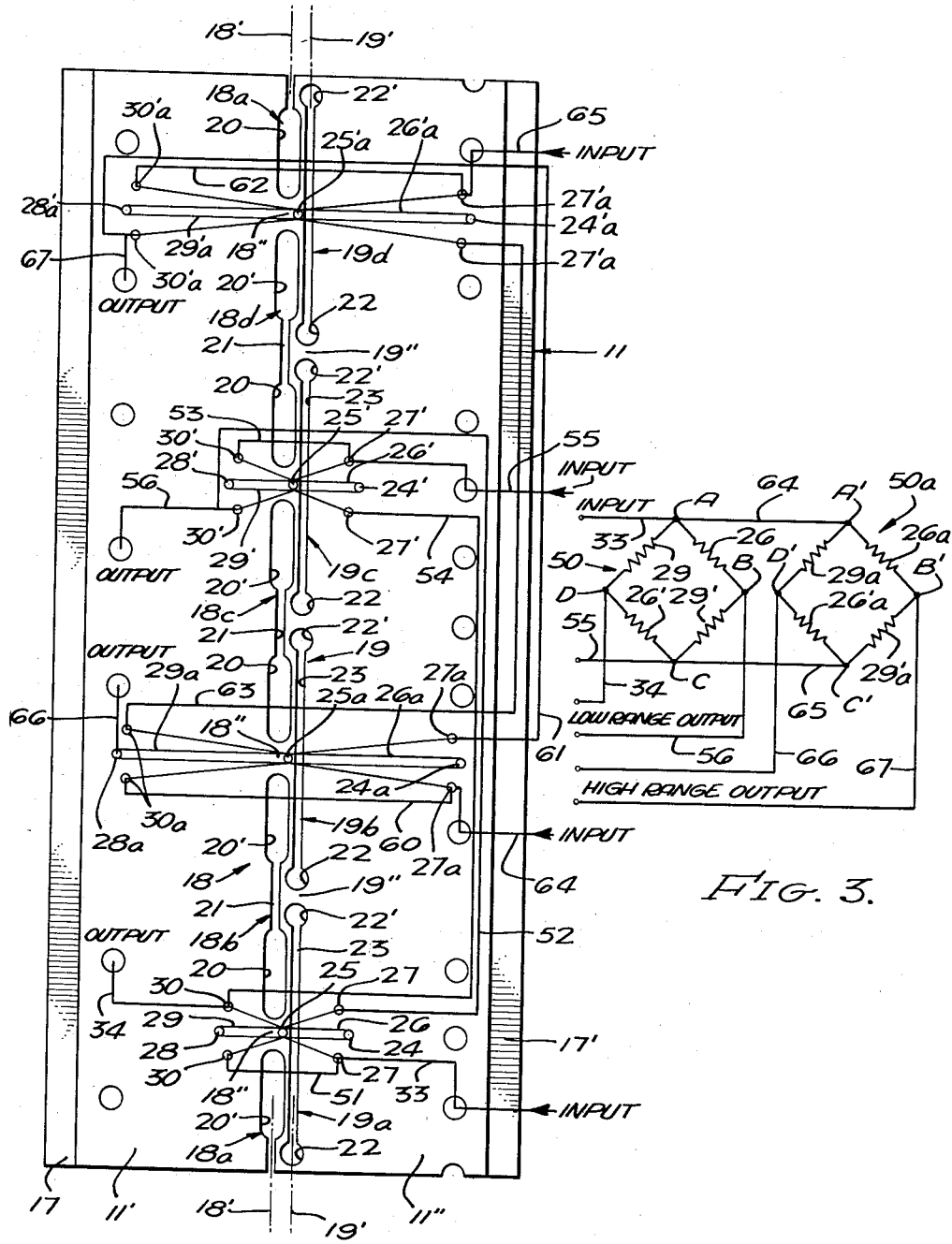
Fig. 2 is a layout of the cylindrical armature of the device of Fig. 1, showing the arrangement of the slots in the armature and the strain gage elements thereon.
Fig. 3 is a schematic layout of the bridge circuits employed in the transducer of Figs. 1 and 2.

The cylindrical armature 11 has flanges 17 and 17' integrally connected to the opposite ends of the armature, and such flanges are connected as by welding to the opposite shoulders 16 on the outer surface of the strain column 10. Referring particularly to Fig. 2, showing a flat development of the cylindrical armature, it will be noted that the central portion of the cylindrical armature 11 is slotted. Such slotted portion comprises a series of arcuate slots 18, here shown as four in number and including slots 18a, 18b, 18c and 18d, which are disposed in alignment about the periphery of the cylinder, the center line 18' of said slots being in a plane perpendicular to the axis of the cylindrical armature. A second series of arcuate slots 19, here shown as four in number and including slots 19a, 19b, 19c and 19d is also formed in the cylinder closely adjacent to slots 18 and parallel thereto about the periphery of the armature cylinder, the center line 19' of slots 19 being in a second plane perpendicular to the axis of the armature. The slots 18 are each formed of two enlarged end portions 20 and 20' connected by a central narrow portion 21. The slots 18 are formed symmetrically about the cylindrical armature. It is noted that between the slots 18 is a metal portion 18''.

It will be seen that slots 19 are staggered with respect to slots 18 so that the narrow central elongated portion 23 of slots 19 are each disposed opposite two of the enlarged portions 20 and 20' of adjacent slots 18 and the slots 19 each have circular end portions 22 and 22' which are disposed opposite the narrow central portion 21 of the slots 18. A small portion of metal 19'' is positioned between the adjacent circular end portions 22 and 22' of the slots 19.

From the foregoing structure it will be seen that slots 18 and 19 form a flexible connection between the two end portions 11' and 11'' of the armature 11. Thus, when a force is applied against the force collector 14, causing the strain column 10 to be displaced, this produces a displacement of the armature 11 such that the two end portions 11' and 11'' of the armature move with the portions of the strain column to which the flanges 17 and 17' are connected. However, when the strain column is compressed by the force collector 14, the left end of the strain column, viewing Fig. 1, is displaced more than the right end of the strain column, since the latter is fixed to the cap 42 and hence resists displacement by compression of the strain column. Hence the block portion 15 of the armature on displacement to the right carries with it the left portion 11' of the armature 11. Since the right portion of the armature is relatively fixed through its connection at flange 17' with the right end of the strain column, the portion 11' of the armature to the left of slots 18 and 19 will move toward the portion 11'' of the armature to the right of said slots. Such relative displacement of the portions 11' and 11'' of the armature is effected with minimum resistance to the force causing compression of the strain column, by reason of the above described slotted structure of the armature, presenting a minimum amount of solid metal, namely, metal portions 18'' and 19'', between the adjacent slots, for connecting together the two relatively movable armature portions 11' and 11''. In effect, the slotted portion of the armature provides a highly resilient connection between the end portions 11' and 11'' of the armature. Also, due to the slotted structure of the armature, the flexure thereby formed is such that the end portions 11' and 11'' of the armature move only axially of the armature and not in any other direction, such as perpendicular to the armature.

Mounted on the armature portion 11'' adjacent the narrow central portion 23 of slot 19a is a pin 24, and disposed on armature portion 11' on the opposite side of the narrow portion 23 of slot 19a and closely adjacent slot 23 is a pin 25. Pins 24 and 25 are positioned parallel to the axis of the cylindrical armature and perpendicular to the slots 18 and 19. A strain wire 26 is mounted in tension on pins 24 and 25, the ends of the strain wire being connected to terminal pins 27. Another pin 28 is mounted on the end portion 11' of the armature adjacent the enlarged portions 20 and 20' of the pair of slots 18a and 18b, pin 28 being spaced from pin 25. A strain wire 29 is looped in tension between pin 28 and pin 25, the ends of such strain wire being in turn connected to terminal pins 30. The pins 24, 25 and 28 are in axial alignment.

It will be noted that since pins 25 and 28 are both mounted on the solid metal portion 18'' between the enlarged slot portions 20 and 20', and since such metal portion 18'' forms a part of the armature portion 11', pins 25 and 28 are displaced the same amount on movement of armature portion 11', and hence no displacement takes place between pins 25 and 28 on displacement of the strain column 10 and the strain on strain wire 29 remains substantially constant. However, as to pins 24 and 25, since the narrow portion 23 of slot 19a separates these pins, and since end portions 11' and 11'' of the armature move with respect to each other on application of a force to the strain column, the pins 24 and 25 will also be displaced with respect to each other, resulting in a change in strain of the strain wire 26. Terminals 27 and 30 are connected to electrical leads 33 and 34.

In a similar manner as that described above, pins 24' and 25' are disposed on the opposite side of the narrow portion 23 of the slot 19c and a strain wire 26' is looped in tension between pins 24' and 25' and connected to terminals 27'. Also, a pin 28' is positioned on the opposite side of the slot 19c from pin 24' and a strain wire 29' is looped in tension between pins 25' and 28', the ends of the strain wire being connected to the terminal pins 30'. The pins 24', 25' and 28' and strain wires 26' and 29' are positioned in the same manner as the corresponding pins 24, 25 and 28, and strain wires 26 and 29, respectively, except in being disposed 180° and diametrically opposite the latter pins and strain wires on the cylindrical armature 11. Hence, pins 24', 25' and 28' are in parallel alignment with the axis of the armature and the strain wire 26' between pins 24' and 25' is displaced on displacement of the strain column so that wire 26' changes in resistance on displacement of said column and the armature, whereas the tension and resistance of strain wire 29' remains fixed since the pins 25' and 28' remain fixed with respect to each other on such displacement. Pins 24, 24', pins 25, 25' and pins 28, 28' are in diametrical alignment with each other, and the strain wires 26 and 26' are coextensive, that is, of equal length, and the strain wires 29 and 29' are coextensive.

In a similar manner as that described above for strain wires 26 and 29, another pair of strain wires 26a and 29a are mounted respectively on pins 24a and 25a across slot 19b, and on pins 25a and 28a. The ends of strain wire 26a are connected to terminals 27a, and the ends of strain wire 29a are connected to terminals 30a.

It will be noted that pins 24a, 25a and 28a, and strain wires 26a and 29a are displaced 90° around the cylindrical armature 11 from pins 24, 25 and 28 and strain wires 26 and 29. Further, it will be noted that the distance between pins 24a and 25a, and the distance between pins 25a and 28a is substantially greater than the distance between pins 24 and 25, and 25 and 28, respectively, and hence the length of strain wires 26a and 29a between their respective pin supports is substantially greater than the length of strain wires 26 and 29 between their respective pin supports.

Likewise, another pair of strain wires 26'a and 29'a are mounted on cylindrical armature 11 and disposed diametrically opposite strain wires 26a and 29a. Strain wire 26'a is mounted on pins 24'a and 25'a across the center portion of slot 19d, and strain wire 29'a is mounted between pins 25'a and 29'a. The ends of strain wires 26'a and 29'a are connected to terminals 27'a and 30'a, respectively. Pins 24 and 24'a, pins 25a and 25'a, and pins 28a and 28'a are in diametrical alignment with each other, and hence the strain wires 26a and 26'a are coextensive, and the strain wires 29a and 29'a are coextensive. The sets of strain wires 26, 29 and 26', 29' and 26a, 29a and 26'a, 29'a are substantially parallel.

Strain wires 26, 29, 26' and 29' are connected together to form a Wheatstone bridge circuit 50 (see Fig. 3), wherein strain wires 26 and 26' constitute the active arms of the bridge and wires 29 and 29' the inactive arms. Lead 51 connecting wires 26 and 29 forms junction A of the bridge, lead 52 connecting wires 26 and 29' forms junction B of the bridge, lead 53 connecting wires 26' and 29' forms junction C of the bridge, and lead 54 connecting wires 26' and 29 forms junction D of the bridge. Leads 33 and 55 connect the opposite junctions A and C of bridge 50 with the input, e.g., in the form of a battery (not shown), and leads 34 and 56 connect the opposite junctions D and B of the bridge 50 with the output, e.g., in the form of a galvanometer or other measuring instrument (not shown).

Similarly, strain wires 26a, 29a, 26'a and 29'a are connected together to form the Wheatstone bridge 50a of Fig. 3, wherein strain wires 26a and 26'a are the active arms of the bridge and wires 29a and 29'a the inactive arms. Lead 60 connecting wires 26a and 29a forms junction A' of bridge 40a, lead 61 connecting wires 26a and 29'a forms the junction B' of this bridge, lead 62 connecting wires 29'a and 26'a forms the junction C' of bridge 50a, and lead 63 connecting wires 26'a and 29a forms the junction D' of the bridge. Leads 64 and 65 are connected to the opposite junctions A' and C' of bridge 50a, and are connected to leads 33 and 55, respectively, and hence are connected to the same input as the input to bridge 50. It is thus seen that the common input is connected in parallel to bridges 50 and 50a. Leads 66 and 67 connect the opposite junctions D' and B' of bridge 50a with the output, e.g., in the form of a galvanometer.

From the above, it will be seen that when a positive pressure is applied to the diaphragm 13, the strain column 10 will be displaced to the right as viewed in Fig. 1. This results in a compression of the strain column and also a compression of the armature 11 carried by the strain column. This produces a movement of armature portion 11' toward portion 11", and a relaxation and change in resistance of the strain wires 26, 26' and 26a, 26'a occurs proportional to the force compressing the strain column.

It will thus be seen that two gages of different lengths are mounted on the armature 11, one gage composed of the strain wire elements 26, 29, 26' and 29', and the other gage composed of strain wires 26a, 29a, 26'a and 29'a. The former having the shorter strain wires is the low range gage and the latter is the high range gage, since the percentage change in strain in the shorter active wires 26 and 26' of bridge 50 when the strain column 10 is compressed by an applied positive pressure against diaphragm 13, is greater than the consequent percentage change in strain in the longer active wires 26a and 26'a under these conditions. Hence, when the active arms 26 and 26' of the low range gage become completely relaxed as a result of the maximum force being applied to the strain column by diaphragm 13 for which the low range gage is sensitive, the active arms 26a and 26'a of the high range gage will not yet have reached their point of complete relaxation, and thus the high range gage will continue to sense forces applied to the column 10 by diaphragm 13, of a magnitude greater than the maximum force for which the low range gage is sensitive, up to a maximum for the high range gage, at which time the active arms 26a and 26'a of the high range gage become completely relaxed.

It is further noted that in the above described device the greatest strain on the strain wires 26 and 26' and 26a and 26'a, which are the active arms of the bridges 50 and 50a, is imparted to the strain wires when they are first wound on the pins 24, 25, 24' and 25', 24a, 25a, and 24'a, 25'a. Imposition of a force against the force collector 14 produces a relaxation of the strain wires 26, 26' and 26a, 26'a, as noted above and, hence, regardless of the force so applied and regardless as to the amount of displacement of the strain column and of the armature due to such force the strain wires 26, 26' and 26a, 26'a, will always have, under these conditions, a strain which is less than that of the original tension on these wires. Hence, automatic overload protection is thus provided without the conventional use of stops and similar means ordinarily employed for this purpose.

The transducer is mounted in a case 37 and a pressure head 38 is connected to one end of the case 37 by means of screws 40, the pressure head 38 and end flange 37' of case 37 clamping the force collector 14 in position. Pressure head 38 has an inlet 39 which communicates with the diaphragm 13 of the force collector. In the pressure head is a threaded bleed valve 41 which communicates via passages 41' with the space adjacent the diaphragm 13.

At the opposite end of the case 37 is mounted a cap 42 by means of the screws 44, there being a ring seal 43 disposed in a recess 43' between the case and the cap 42. The cap 42 carries an inwardly extending flange 42' which receives the end 10a of the strain column 10 and holds it in position by a force fit or by welding the engaging surfaces. It is thus seen that end 10a of the strain column remains fixed while the opposite end of 10 carrying block 15 is displaced relative to end 10a on application of a force to the strain column by the force collector 14.

A terminal plate 45 is mounted on the cap 42, and on said terminal plate are a number of terminals 46 corresponding to terminals A, B, C, D and A', B', C' and D' of bridges 50 and 50a. Mounted on the cap 42 by means of the screws 45' is a cover 47 having connected thereto external terminals 48.

A stay plate 49 is mounted in a recess 49a of flange 37' by means of screws 49b. The stay plate 49 has a central aperture 49c which receives the flange 12' with sufficient clearance to permit axial motion of flange 12' but preventing any undue lateral motion thereof. Oversize holes 49b' are provided for screws 49b to permit adjustment of the plate.

It will be noted that by increasing or decreasing the area of the piston 12 of the force collector, the range of the instrument can be varied further. Thus, by increasing the area of the piston the range of the instrument is decreased, and by decreasing the piston area the range of the instrument can be increased.

While I have described an instrument in which the armature is positioned about the elongated strain member or strain column, the instrument can be modified so that the armature is in the center and the elongated strain member, e.g., in the form of a tube, is positioned about the armature.

It will be further understood that instead of applying a force produced by fluid pressure to the strain column, I can connect a rod to an end of the strain column for measurement of forces applied directly to the rod by means other than fluid pressure, or the instrument can be employed as a linear accelerometer by attaching a mass to an end of the strain column for measuring acceleration along the axis of the strain column.

Although the invention principles have been illustrated above in connection with the incorporation of two gages of different lengths on the strain column, I can modify this device by additional strain gages of varying lengths.

Further, while the invention principles have been illustrated with respect to a specific form of transducer, it will be understood that said principles can be applied to any form of unbonded strain wire transducer having a pair of members which are movable with respect to each other, with two or more strain wires of different gage lengths mounted on said members.

While I have described particular embodiments of my invention for the purpose of illustration, it should be understood that various modifications and adaptations thereof may be made within the spirit of the invention as set forth in the appended claims.

I claim:

1. A transducer which comprises a first member, a second member, means rendering said members movable with respect to each other, first wire connections mounted on said first and second members, second wire connections mounted on said first and second members, a first strain wire mounted on said first connections, a second strain wire mounted on said second connections, said second connections being in substantially parallel alignment with said first connections so that said first and second strain wires are substantially parallel, said first wire connections being movable with respect to each other and said second wire connections being movable with respect to each other, in response to relative motion of said first and second members, to thereby change the tension in said respective first and second strain wires, said second wire connections being spaced farther apart than said first wire connections so that said second strain wire is longer than said first strain wire.

2. A transducer which comprises a strain column, an armature connected to said strain column at spaced points axially of said column, said armature between said spaced points being free of said column, said armature having an arcuately slotted portion between said spaced points, first spaced wire connections on said armature disposed axially thereof on opposite sides of the slotted portion of said armature, a first electrical resistance strain wire connected to said first wire connections, a plurality of second spaced wire connections on said armature disposed axially thereof on opposite sides of the slotted portion of said armature, said second wire connections being spaced arcuately from said first wire connections, and said second wire connections being spaced farther apart axially of each other than said first wire connections, a second electrical resistance strain wire connected to said wire connections, said second wire connections being in substantially parallel alignment with said first wire connections so that said first and second strain wires are substantially parallel, and a force collector connected to said strain column.

3. A transducer which comprises a strain column, an armature positioned about said strain column, said armature being connected to said strain column at spaced points axially of said column, said armature between said spaced points being spaced radially of said column, a plurality of slots in said armature arcuately positioned about said armature between said spaced points, the center line of said slots being in a plane substantially normal to the axis of said armature, a plurality of first spaced wire connections on said armature disposed axially thereof on opposite sides of the slotted portion of said armature, a first electrical resistance strain wire connected to said first wire connections, a plurality of second spaced wire connections on said armature disposed axially thereof on opposite sides of the slotted portion of said armature, said second wire connections being spaced arcuately from said first wire connections and said second wire connections being spaced further apart from each other than said first wire connections, a second electrical resistance strain wire connected to said second wire connections, and a force collector connected to said strain column.

4. A transducer which comprises a strain column, an armature connected to said strain column at spaced points axially of said column, said armature between said spaced points being free of said column, a plurality of slots in said armature arcuately positioned about said armature between said spaced points, the center line of said slots being in a plane substantially normal to the axis of said armature, a plurality of first spaced wire connections on said armature disposed axially thereon on opposite sides of the slotted portion of said armature, a first electrical resistance strain wire connected to said first wire connections, a plurality of second spaced wire connections on said armature disposed axially thereof on opposite sides of the slotted portion of said armature, said second wire connections being spaced arcuately from said first wire connections and said second wire connections being spaced farther apart from each other than said first wire connections, a second electrical resistance strain wire connected to said second wire connections, said second wire connections being in substantially parallel alignment with said first wire connections so that said first and second strain wires are substantially parallel, and a force collector connected to said strain column.

5. A transducer which comprises an elongated strain member, an armature connected to said strain member at spaced points axially of said member, said armature between said spaced points being free of said elongated member, said armature having a slotted portion including a plurality of arcuately disposed slots, a pair of first strain wires mounted in tension on said armature axially of said strain member across the slots of said slotted portion, said first strain wires disposed diametrically opposite each other, said first strain wires being coextensive, a pair of second strain wires mounted in tension on said armature axially of said strain member across the slots of said slotted portion, said second strain wires being disposed diametrically opposite each other and spaced arcuately from said first strain wires, said second strain wires being coextensive, the length of said second strain wires being greater than the length of said first strain wires, and a force collector connected to said strain member.

6. A transducer which comprises an elongated strain member, an armature connected to said strain member at spaced points axially of said member, said armature between said spaced points being free of said elongated member, said armature having a slotted portion including a plurality of arcuately disposed slots located between said spaced points in a plane substantially normal to the longitudinal axis of said armature, a pair of first strain wires mounted in tension on said armature axially of said strain member across the slots of said slotted portion, said first strain wires disposed diametrically opposite each other, said first strain wires being coextensive, a pair of second strain wires mounted in tension on said armature axially of said strain member across the slots of said slotted portion, said second strain wires being disposed diametrically opposite each other and spaced arcuately from said first strain wires, said second strain wires being coextensive, the length of said second strain wires being greater than the length of said first strain wires, an electrical connection at the ends of said strain wires, and a force collector connected to said strain member.

7. A transducer which comprises a strain column, a substantially cylindrical armature connected to said strain column, connections at opposite ends of said armature between said armature and said strain column and disposed axially of said column, said armature between said connections being spaced radially of said column, a plurality of slots arcuately positioned symmetrically about the periphery of said armature between said connections, first spaced wire connections on said armature disposed axially thereof on opposite sides of the slotted portion of said armature, a first electrical resistance strain wire connected to said first wire connections, second spaced wire connections on said armature disposed axially thereof on opposite sides of the slotted portion of said armature, said second wire connections being disposed diametrically opposite said first wire connections, an electrical resistance strain wire connected to said second wire connection, third spaced wire connections on said armature disposed axially thereof on opposite sides of the slotted portion of said armature, a third electrical resistance strain wire connected to said third wire connections, fourth spaced wire connections on said armature disposed axially thereof on opposite sides of the slotted portion of said armature, a fourth electrical resistance strain wire connected to said fourth wire connections, said fourth wire connections being disposed diametrically opposite said third wire connections, said third and fourth wire connections being spaced arcuately from said first and second wire connections, an electrical connection at the ends of said strain wires, said third wire connections and said fourth wire connections being spaced farther apart respectively from each other than said first and second wire connections, and a force collector connected to said strain column.

8. A transducer which comprises a strain column, a substantially cylindrical armature positioned about said strain column, connections at opposite ends of said armature between said armature and said strain column and disposed axially of said column, said armature between said connections being spaced radially of said column, a plurality of slots arcuately positioned symmetrically about the periphery of said armature between said connections, the center line of said slots being in a plane substantially normal to the axis of said armature, first spaced wire connections on said armature disposed axially thereof on opposite sides of the slotted portion of said armature, a first electrical resistance strain wire connected to said first wire connections, second spaced wire connections on said armature disposed axially thereof on opposite sides of the slotted portion of said armature, said second wire connections being disposed diametrically opposite said first wire connections, an electrical resistance strain wire connected to said second wire connection, third spaced wire connections on said armature disposed axially thereof on opposite sides of the slotted portion of said armature, a third electrical resistance strain wire connected to said third wire connections, fourth spaced wire connections on said armature disposed axially thereof on opposite sides of the slotted portion of said armature, a fourth electrical resistance strain wire connected to said fourth wire connections, said fourth wire connections being disposed diametrically opposite said third wire connections, said third and fourth wire connections being spaced arcuately from said first and second wire connections, an electrical connection at the ends of said strain wires, said third wire connections and said fourth wire connections being spaced farther apart respectively from each other than said first and second wire connections, said first, second, third and fourth strain wires being substantially parallel, electrical connections at the ends of said strain wires, and a force collector connected to said strain column.

9. A transducer which comprises a strain column, a substantially cylindrical armature encircling said strain column, connections between said armature and said strain column located at opposite ends of said armature, said armature between said connections being spaced radially from said strain column, said armature moving axially with said column in response to axial displacement thereof, a plurality of first aligned arcuate slots in said armature intermediate the ends thereof, a plurality of second aligned arcuate slots in said armature closely spaced from said first slots axially of said armature, the center line of said first slots and the center line of said second slots each being in a plane substantially normal to the axis of said armature, said second slots being staggered from said first slots whereby a portion of the entire periphery of said armature is slotted and forming a resilient connection between opposite end portions of said armature, a first set of wire connections positioned on opposite sides of said slots axially of said armature, a second set of wire connections positioned on opposite sides of said slots axially of said armature and spaced arcuately from said first wire connections, a first strain wire looped in tension between said first set of wire connections, a second strain wire looped in tension between said second set of wire connections, the distance between the respective second wire connections being greater than the distance between the respective first wire connections, whereby the length of said second strain wire is greater than the length of said first strain wire, an electrical connection at the ends of each of said strain wires, and a force collector connected to said strain column.

10. A transducer which comprises an elongated strain column, a substantially cylindrical armature encircling said strain column, connections between said armature and said strain column located at opposite ends of said armature, said armature between said connections being spaced radially from said strain column, said armature moving axially with said column in response to axial displacement thereof, a plurality of first aligned arcuate slots in said armature intermediate the ends thereof, a plurality of second aligned arcuate slots in said armature closely spaced from said first slots axially of said armature, the center line of said first slots and the center line of said second slots each being in a plane substantially normal to the axis of said armature, said second slots being staggered from said first slots whereby a portion of the entire periphery of said armature is slotted, and forming a resilient connection between opposite end portions of said armature, a first set of pins positioned on opposite sides of said second slots, one of said first pins being located on said armature between adjacent first slots, a second pair of pins positioned on opposite sides of said second slots and substantially diametrically opposite said first pins, one of said second pins being located on said armature between adjacent first slots, a first strain wire looped in tension between said first set of pins, a second strain wire looped in tension between said second set of pins, a third set of pins positioned on opposite sides of said second slots, one of said third pins being located on said armature between adjacent first slots, a fourth pair of pins positioned on opposite sides of said second slots and substantially diametrically opposite said third pins, one of said fourth pins being located on said armature between adjacent first slots, a third strain wire looped in tension between said third set of pins, a fourth strain wire looped in tension between said fourth set of pins, said fourth set of pins being disposed diametrically opposite said third set of pins, said third and fourth sets of pins being disposed arcuately about 90° from said first and second sets of pins respectively, the respective pins of said first and second sets of pins being spaced axially substantially equally from each other, and the respective pins of said third and fourth sets of pins being spaced axially substantially equally from each other, all of said strain wires being substantially parallel, the space between the respective pins of said third and fourth sets of pins being greater than the space between the respective pins of said first and second sets of pins, whereby the length of said third and fourth strain wires is greater than the length of said first and second strain wires, an electrical connection at the ends of each of said strain wires, and a force collector connected to said strain column.

References Cited in the file of this patent

UNITED STATES PATENTS

| | | |
|---|---|---|
| 2,260,036 | Kuehni | Jan. 11, 1941 |
| 2,622,176 | Baker | Dec. 16, 1952 |
| 2,835,774 | Statham | May 20, 1958 |
| 2,855,779 | Zaid | Oct. 11, 1958 |